United States Patent [19]
Hayner

[11] 3,750,710
[45] Aug. 7, 1973

[54] VARIABLE FLUID ORIFICE
[75] Inventor: Paul F. Hayner, Lexington, Mass.
[73] Assignee: Sanders Associates, Inc., Nashua, N.H.
[22] Filed: Oct. 12, 1971
[21] Appl. No.: 188,284

[52] U.S. Cl.................................. 138/40, 138/44
[51] Int. Cl.............................................. F15d 1/02
[58] Field of Search ................. 138/40, 44, 46, 45, 138/42, 41, 43; 160/179; 137/517, 525.5

[56] References Cited
UNITED STATES PATENTS
2,593,315  4/1952  Kraft..................................... 138/45
2,832,406  4/1958  Turenne............................. 160/179
3,523,559  8/1970  Gibson................................ 138/46

Primary Examiner—Samuel B. Rothberg
Assistant Examiner—Steven M. Pollard
Attorney—Louis Etlinger

[57] ABSTRACT

A restrictor is described which includes a resilient plate with portions cut to define flexible vanes which deflect with increasing pressure to form an orifice the effective area of which increases with differential pressure in such a way that the differential pressure is a predetermined function of the rate of flow of fluid therethrough.

9 Claims, 5 Drawing Figures

PATENTED AUG 7 1973 3,750,710

VARIABLE FLUID ORIFICE

FIELD OF THE INVENTION

This invention relates to hydraulic restrictors for insertion in a confined fluid flow path for reducing the pressure of fluid flowing therethrough.

BACKGROUND OF THE INVENTION

In hydraulic systems, a restrictor of one kind or another is frequently inserted into a flow path such as a conduit for the purpose of reducing the pressure. Such reduction in pressure may be desired if the utilization device requires fluid at a pressure lower than that available from the source of supply. In other circumstances, a restrictor may be used as a measuring device. The pressure drop across such a restrictor is a measure of the rate of the fluid flow therethrough and can be used in control apparatus. A simple orifice may be used for such a purpose but has the disadvantage that the pressure drop is proportional to the square of the rate of flow. This makes instrumentation inconvenient because some compensation must be made for this square law situation. The use of a laminar flow restrictor in place of a simple orifice has been proposed but such restrictors have been found to be quite temperature sensitive, that is, the pressure drop across such an orifice varies not only with the rate of flow therethrough but also with the temperature of fluid. As far as Applicant is aware, there has been, prior to the present invention, no restrictor available in which the pressure drop is a linear function of the rate of flow therethrough and at the same time is relatively insensitive to changes in temperature.

It is a general object of the present invention to provide an improved restrictor for reducing the pressure of fluid flowing through a confined flow path.

A more specific object is to provide a restrictor such that the pressure drop thereacross is a linear function of the rate of flow of fluid therethrough and at the same time it is relatively insensitive to variations in the temperature of the fluid.

SUMMARY OF THE INVENTION

Briefly stated, a restrictor in accordance with the present invention comprises an orifice the effective area of which changes as the pressure drop thereacross changes. A preferred embodiment includes a plurality of resilient vanes in the flow path which deflect with an increase of differential pressure so as to increase the effective area of the orifice. By suitably selecting the material and the arrangement of the vanes, a restrictor can be made in which the area varies in such a way that the pressure drop thereacross is a linear function of the rate of flow therethrough over a substantial range of operating conditions.

DESCRIPTION OF PREFERRED EMBODIMENT

For a clearer understanding of the invention reference may be made to the following detailed description and the accompanying drawing in which.

Figure 1:
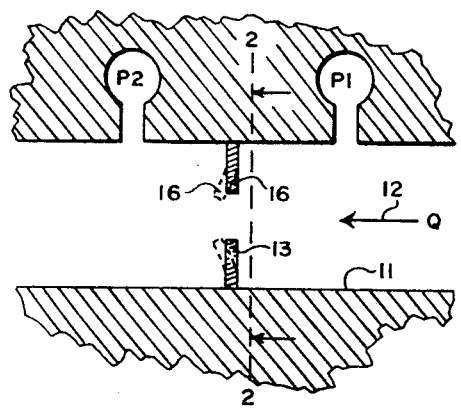
FIG. 1 is a schematic diagram showing a restrictor in accordance with the present invention installed in a conduit.

Referring first to FIG. 1 there is shown a fluid flow path or conduit 11, assumed for present purposes to be circular in cross section. Fluid is assumed to be flowing through the conduit 11 from right to left as indicated by the arrow 12 at a rate Q. Fastened transversely across the interior of the conduit 11 is a thin circular plate 13. Its thickness is greatly exaggerated in FIG. 1 for clarity. The plate 13 is assumed to be fastened all the way around its periphery to the interior surface of the conduit 11. The plate 13 is formed with a central aperture 14. The plate 13 is also formed with a series of radially extending cut away portions or slits 15 extending toward but not extending as far as the outer periphery of the plate. These slits, along with the aperture 14, define a series of vanes 16. The plate 13 is preferably made of a resilient material such as beryllium copper or spring stainless steel thin enough so that as fluid flows through the conduit 11, the vanes will deflect as shown by the dotted outline in FIG. 1 thereby effectively increasing the area of the orifice which comprises the aperture 14 and the space between adjacent vanes 16. The exact dimensions of the plate 13 and the vanes 16 will of course depend upon the size of the conduit 11 in which it is to be used, the flow rate expected and the pressure drop required.

Figure 3:
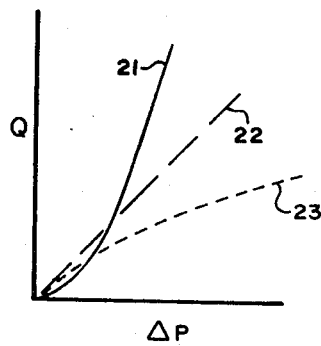
FIG. 3 is a graph useful in explaining the invention.

Referring now to FIG. 3 there are shown several curves depicting the rate of flow Q of fluid through various kinds of orifices as a function of the pressure drop, $\Delta P$, across the orifice. The solid curve 21 represents the flow through an ordinary fixed orifice and is represented by the equation $$Q = KA \sqrt{\Delta P}$$

Where $Q$ equals the rate of flow, $K$ is an arbitrary constant, $A$ is the area of the orifice, and $\Delta P$ is the pressure drop across the orifice. It has been found possible to select the dimensions and material of the plate 13 and the number and size of the slits 15 and the vanes 16, with due regard to the size of the conduit 11 and the flow rates expected, so that the effective area of the orifice increases with the flow rate and pressure in such a way as to reduce the curvature of the curve 21. More particularly, it has been found possible to make the relationship between $Q$ and $\Delta P$ a substantially linear one over a considerable range as shown by the curve 22 of FIG. 3. It is even possible to design the orifice to have a curvature in the opposite direction as shown by the curve 23 of FIG. 3. However, it is believed that the invention will have its widest application when made so that the relationship between $Q$ and $\Delta P$ is substantially linear. Under these circumstances, the effective area of the orifice, A is a linear function of the square root of $\Delta P$.

Figure 2:
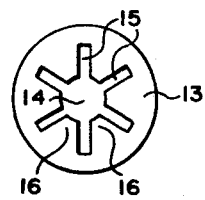
FIG. 2 is cross section view taken on the line 2—2 of FIG. 1 showing a preferred arrangement.
Figure 4:
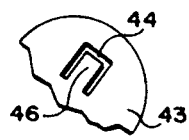
FIG. 4 is a schematic diagram showing an alternative form of the invention.

Referring now to FIG. 4, there is shown an alternate form of the invention. A thin resilient plate 43, similar to the plate 13 in FIGS. 1 and 2, is formed with a plurality of cut away portions such as that shown at 44, each of which defines a generally rectangular tab or vane 46. Such tabs or vanes can be used with or without a central aperture.

Figure 5:
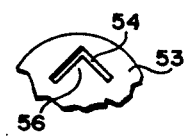
FIG. 5 is a schematic diagram showing another alternative form of the invention.

Another form of the invention is shown in FIG. 5 wherein a plate 53 similar to the plate 13 of FIGS. 1 and 2 is formed with a plurality of cut away portions such as that shown at 54 so as to define a plurality of generally triangular tabs or vanes at 56. These also may be used with or without a central aperture. In each of FIGS. 2, 4 and 5 the tabs deflect as cantilever beams.

Although a preferred embodiment of the invention has been described in considerable detail for illustrative purposes, many modifications will occur to those skilled in the art. It is therefore desired that the protection afforded by Letters Patent be limited only by the true scope of the appended claims.

What is claimed is:

1. A restrictor comprising
a conduit for confining the flow of fluid to the interior thereof,
a thin resilient platelike member having portions cut to define resilient vanes substantially coplanar with the remainder of said member in the absence of a pressure differential on opposite sides thereof, and which deflect in response to incident fluid pressure and define an orifice,
said plate being mounted transversely within said conduit substantially perpendicular to the interior surface thereof and with its periphery substantially sealed thereto so as to constrain substantially all of the fluid flowing through said conduit to flow through said orifice.

2. A restrictor in accordance with claim 1 in which the cross section of said conduit and said platelike member are both substantially circular.

3. A restrictor in accordance with claim 1 in which said platelike member is formed with a central aperture.

4. A restrictor in accordance with claim 3 in which said vanes are defined by said central aperture and a plurality of radially extending slits formed in said member.

5. A restrictor in accordance with claim 1 in which said vanes are generally rectangular in shape.

6. A restrictor in accordance with claim 1 in which said vanes are generally triangular in shape.

7. A restrictor comprising
a conduit defining a fluid flow path,
a platelike member disposed substantially perpendicular to said flow path and having its periphery fastened to the interior surface of said conduit,
said platelike member having portions cut to define a plurality of vanes substantially coplanar therewith in the absence of external forces,
said member being formed of a thin resilient material such that said vanes deflect as fluid flows through said conduit thereby defining an orifice the area of which increases as the flow therethrough increases.

8. A restrictor for insertion in a conduit in which fluid is flowing comprising
a generally circular platelike member disposed substantially coplanar to the interior of said surface of said conduit and having its periphery fastened thereto,
said member being formed with a central circular aperture,
said member also being formed with a plurality of normally coplanar vanes defined by a plurality of slits extending radially from said central aperture,
said central aperture and the spaces between said vanes defining an orifice,
said plate being formed of a thin resilient material such that said vanes deflect as fluid flows through said conduit thereby increasing the effective area of said orifice as the pressure differential on opposite sides of said orifice and the flow of fluid through said conduit increase.

9. A restrictor in accordance with claim 8 in which the material and dimensions of said member and the number and size of said vanes is selected such that the effective area of said orifice varies as the square root of the pressure drop thereacross.

* * * * *